Jan. 11, 1966 F. R. SCHUBERT 3,228,730
TRACTOR-TRAILER BRAKING SYSTEM
Filed Jan. 13, 1964 2 Sheets-Sheet 2
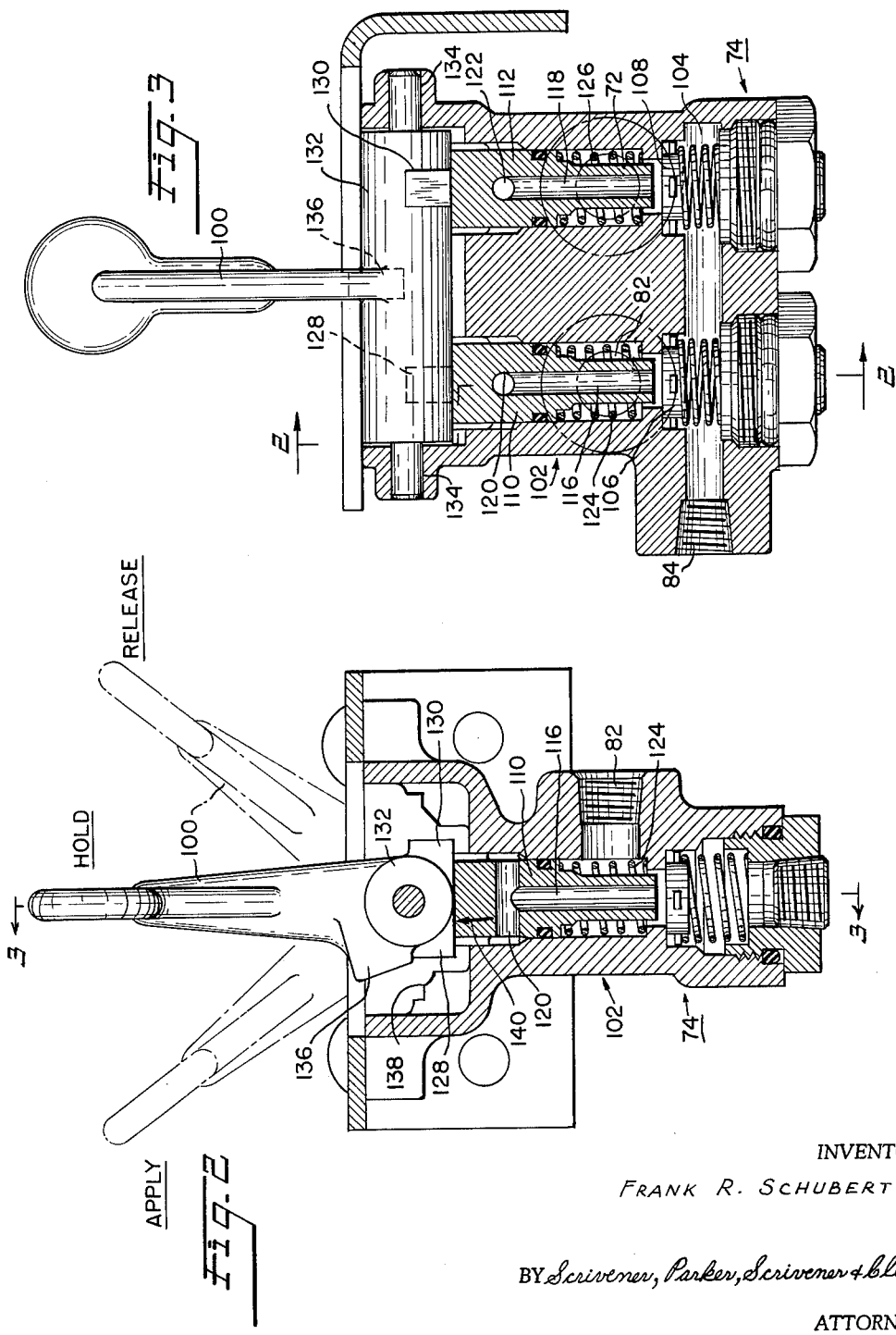
INVENTOR
FRANK R. SCHUBERT
BY Scrivener, Parker, Scrivener & Clarke
ATTORNEYS United States Patent Office 3,228,730
Patented Jan. 11, 1966

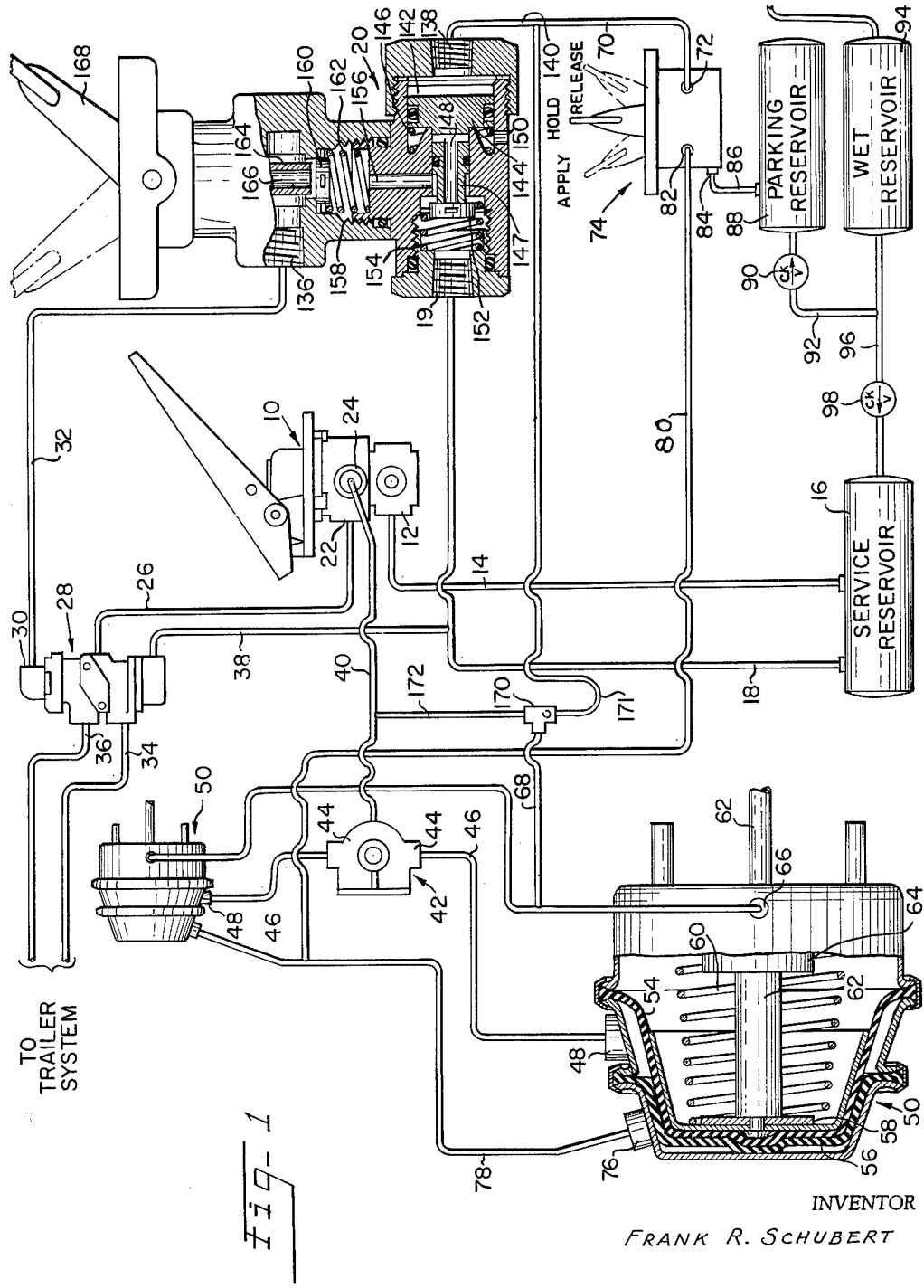

3,228,730
TRACTOR-TRAILER BRAKING SYSTEM
Frank R. Schubert, Elyria, Ohio, assignor to Bendix-Westinghouse Automotive Air Brake Company, Elyria, Ohio, a corporation of Delaware
Filed Jan. 13, 1964, Ser. No. 337,492
2 Claims. (Cl. 303—7)

This invention relates to fluid pressure braking systems for vehicles and more particularly to safety and parking brake mechanism for such systems.

The present invention is particularly concerned with tractor-trailer combinations wherein the tractor is provided with parking and emergency brake mechanism which serves to lock the tractor brakes in applied position during parking and includes fluid pressure operated emergency brake applying means which can be utilized either for normal parking or to effect the emergency application of the brakes in the event of failure of the service system. A prior application of Frank R. Schubert, Serial No. 263,330 filed March 6, 1963 and assigned to the same assignee as the present invention, describes in detail emergency and parking brake mechanism for which the present invention is especially adapted. Broadly, the brake mechanism there described comprises a double diaphragm actuator and a mechanical one-way lock which, during normal vehicle operation, is retained against spring force by fluid pressure in a non-locking position and the brakes are applied in the normal manner by application of fluid pressure under the control of the operator to the space in the actuator between the diaphragms whereby one of the diaphragms is operated in a brake applying direction to apply the brakes. At the same time, this pressure is exerted in the opposite direction against the second diaphragm in the actuator and this diaphragm performs no function during normal service operation of the brake. When the vehicle employing the mechanism of the present and the prior application is to be parked a control valve is operated to release the pressure from the lock mechanism so that this moves under spring pressure to its locking position. At the same time, pressure may be applied to the second or emergency diaphragm and this is moved against the first diaphragm and the brake push rod so that the latter is moved in a braking direction, the lock, through wedging action, preventing return of the brake push rod to its brake release position.

The mechanism outlined above and described in detail in the co-pending application is effective and practical in every respect and it is the broad object of the present invention to incorporate in a tractor braking system employing the described mechanism, means whereby upon application and release of the parking brakes on the tractor the fluid pressure operated brakes of the trailer attached to the tractor are simultaneously applied and released under the control of the same valve which controls the application and release of the parking brake mechanism.

Another object of the invention is to provide in a system of the foregoing nature a novel vent valve which enables the brakes on the trailer to be independently applied or released whenever the tractor brakes are released but positively prevents release of the trailer brakes when the tractor brakes are locked in applied position.

Still another object of the invention is to provide a novel vent valve which accomplishes the foregoing and also serves to isolate a parking fluid pressure reservoir from a normal service fluid pressure reservoir in the event of depletion of pressure from the latter whereby the pressure conserved in the parking reservoir may be utilized to effect an emergency application of the tractor brakes.

FIG. 1 is a diagrammatic view partly in section of a tractor trailer brake system embodying the principles of the present invention;

FIG. 2 is an enlarged cross-sectional view of a parking control valve constructed in accordance with the invention and taken substantially on the line 2—2 of FIG. 3; and FIG. 3 is a cross-sectional view of the valve of FIG. 2 taken substantially on the line 3—3 of FIG. 2.

Referring now to the drawings and particularly to FIG. 1 thereof the numeral 10 refers to a typical pedal operated brake valve having an inlet port 12 connected by a conduit 14 to a service fluid pressure reservoir 16 which is also connected by way of a conduit 18 to the inlet port 19 of a valve member 20. The brake valve 10 is also provided with a pair of outlet ports 22, 24, the first of which is connected by way of a conduit 26 with the service port of a tractor protection valve, generally indicated by the numeral 28 and which may be of the type shown in Patent No. 2,850,330 to Andrews. The valve 28 is of a well-known type and includes at its upper end a control port 30 leading to a control chamber which receives pressure by way of a conduit 32 such that when pressure above a pre-determined level is admitted to the control port the valve is actuated to inter-connect the trailer emergency and service conduits, indicated by the numerals 34 and 36, with the corresponding conduits 38 and 26 on the opposite side of the valve as shown. It will be noted that the emergency conduit 38 is directly connected to the service fluid pressure reservoir 16 by way of the aforementioned conduit 18. When the pressure at the control port 30 of the valve 28 falls below a pre-determined safe level or is deliberately released, the valve 28 is actuated to close off the conduits 38, 26, while simultaneously the trailer emergency and service conduits 34, 36 are connected to atmosphere so as to effect an emergency application of the trailer brakes in a manner well recognized by those skilled in the art.

Referring again to brake valve 10, the second outlet port 24 of the valve is connected by way of a conduit 40 to a conventional quick release valve generally indicated by the numeral 42. The valve 42 is provided with the usual outlet ports 44, each of which is connected by way of a conduit 46 to the service port 48 of a brake mechanism actuator generally indicated by the numeral 50 and more particularly described in the aforementioned co-pending application, Serial No. 263,330, to which reference is made for a detailed description.

As should be clear from FIG. 1, the service port 48 leads to the chamber of the actuator 50 between a first service diaphragm 54 and a second emergency diaphragm 56. A push plate 58 is urged by a spring 60 against an inner face of the diaphragm 54 and carried by the push plate 58 is a push rod 62 which extends through a brake lock mechanism generally indicated by the numeral 64 and which may be of the type described in the aforementioned application. A lock port 66 in the actuator body 52 leads to the lock mechanism 64 and is connected by way of conduit 68 double check valve 170, conduits 171 and 70 to one outlet port 72 of a control valve 74 hereinafter described in detail. For purposes of the present application it is sufficient to say that when pressure is admitted through the conduit 70 and 68 to the lock port 66 the lock mechanism 64 is suspended in non-locking position and when pressure is exhausted from the port 66 the lock is spring-urged to locking position and is arranged to permit the push rod 62 to move to the right in FIG. 1 while positively preventing its return. However, so long as pressure above a pre-determined level exists at the lock port 66, when service pressure is admitted to the service inlet port 48 the service diaphragm 54 moves the push rod 62 to the right to effect a normal service application of the tractor brakes. In addition to the service inlet port 48 the brake mechanism 50 is provided with an emergency port 76 which is connected by way of conduits 78 and 80 with a second outlet port 82 in the control valve 74. It will be apparent from an inspection of FIG. 1 that when pressure is admitted to the emergency port 76 the emergency diaphragm 66 is actuated to move the push rod 62 to the right to effect an emergency application of the tractor brakes.

Referring now to the control valve 74, this is provided with an inlet port 84 which is connected by way of a conduit 86 with an isolated, parking reservoir 88 which is supplied with fluid through a check valve 90 and a conduit 96 from a wet reservoir 94 which also serves to supply fluid through a conduit 96 and a check valve 98 to the aforementioned service reservoir 16. The valve 74 is of the three-way variety and is provided with a handle 100 which is movable between three positions of "Apply," "Hold," and "Release," as labeled in the drawings. When the handle 100 is in the phantom line "Release" position the inlet port 84 is connected to the outlet port 72 to admit fluid pressure to the lock port 66 by way of conduit 70 and 68 to move the lock to its release position, thus permitting subsequent normal service brake operation. When the handle is moved to the "Apply" position the inlet port 84 is connected to the outlet port 82 so that fluid flows by way of conduits 80, 78 to the emergency inlet port 76 of the actuator so as to operate the emergency diaphragm 56 to move the push rod in a brake applying direction. Because in the "Apply" position of the handle, the outlet port 72 of the valve 74 is connected to atmosphere, no pressure exists at the lock port 66 and after the brake has been moved to applied position it is retained in this position by engagement of the lock with the push rod 62. Now when the handle 100 is released it automatically returns to the intermediate solid line "Hold" position where the inlet port 84 is disconnected from the outlet port 82 and the latter is connected to atmosphere to release the air from the emergency diaphragm 60 so that the brakes are now locked in parked position with no air in the actuator. To prevent an inadvertent service brake application from being locked on in either the "Apply" or "Hold" position of the lever 100, the double check valve 170 is provided between the branch conduits 171 of conduit 70 and 172 of conduit 40 so that the lock port 66 by way of conduit 68 can be charged to release the locks from either branch conduit.

The control valve 74 is shown in detail in FIGS. 2 and 3 and comprises a body 102 containing two identical side by side valve mechanisms which serve to control the flow of fluid between the inlet port 84 and the outlet ports 72, 82. As can be seen in FIG. 3, the inlet port 84 leads to a cross-passage 104 containing a pair of check valves 106, 108 which are normally urged by spring pressure to closed position. Spaced above the check valves are a pair of plungers 110, 112 containing central exhaust passages 116, 118 whose upper ends are at all times connected to atmosphere through the top of the valve body by way of cross passages and ports 120, 122 as clearly shown in the drawings. The plungers are normally urged to their raised position in the drawings by springs 124, 126 and are movable downwardly against the springs by means of cam lobes 128, 130 integral with a barrel 132 rotatably supported at its opposite ends in suitable bearings 134 in the valve body. The handle 100 is integral with the barrel and extends upwardly therefrom symmetrically with respect to the cams 128, 130. It will be obvious from FIGS. 2 and 3 that when the handle 100 is moved from the central "Hold" position to the "Release" position, the cam 130 will act on the right hand plunger 112 to move this downwardly against the check valve 108 to first close off the exhaust passage 118 and thereafter open the check valve 108 to connect the inlet port 84 to the outlet port 72 so that fluid flows to the lock port 66 to move the lock to its non-locking position as previously explained.

When the handle 100 is moved to the "Apply" position the cam 128 operates on the plunger 110 to open the check valve 106 and admit fluid to the emergency port 76 to apply the brakes by the emergency diaphragm 56 as described, and it will be apparent from FIG. 2 when the handle is either in the "Apply" or "Release" position only one of the cams serves to operate its valve while the other remains idle so that when one valve is open to pressure the outlet port leading to the other valve is connected to atmosphere. Obviously when the handle is in "Hold" position both check valves are closed as in FIG. 3 and both outlet ports are connected to atmosphere.

In accordance with the invention, it is desirable that the handle not remain in the "Apply" position after the brakes have been applied and locked in this position. That is to say, after the vehicle has been parked as soon as the operator releases the handle it should return automatically to "Hold" position in order that the operator may be informed as to whether or not the brakes are locked-on before leaving the vehicle. This is achieved in the present invention by providing the barrel 132 on one side with an integral lobe or stop member 136 which is adapted to engage a fixed abutment 138 at a point wherein the cam 128 is prevented from moving past dead center below the axis of the barrel 132 whereby the upward force of the spring 124 on the plunger 110 is exerted to the left of the axis as indicated by the arrow 140 so that as soon as the operator releases the handle it is immediately and automatically snapped back to the "Hold" position of FIG. 2.

On the other hand, when the handle is moved to the "Release" position it is necessary that it remain in this position in order that the check valve 108 be retained open so that fluid pressure exists at the lock port 66 during normal brake operation to retain the lock in its non-locking position. This is achieved by eliminating any stop means on the opposite side of the barrel whereby the cam 130 may move past dead center to the approximate position of the arrow 140 on the left of the axis of the barrel whereby the upward force of the spring 126 acting on plunger 112 tends to move the handle 100 in a clock-wise direction in FIG. 2 and the handle is thus retained in the "Release" position.

In accordance with the invention where the described brake mechanism is employed with a tractor-trailer combination it is desirable that when the brakes of the tractor are parked the fluid pressure actuated brakes on the trailer be also applied. It is also desirable under these conditions that the trailer brakes be not releasable so long as the tractor brakes are parked but that when the latter are released it is desirable that the trailer brakes be under the full control of the operator, independently of the tractor brakes, to either apply or release the trailer brakes. This is accomplished in the system of the present invention by the provision of the aforementioned valve 20 which is interposed between the service reservoir 16 and the control port 30 of the tractor protection valve 28. As previously mentioned, the valve 20 has an inlet port 19 which is connected by way of conduit 18 with the service reservoir 16 and has an outlet port 136 connected to the conduit 32 leading to the control port 30. In addition, the valve 20 is provided with a control port 138 which is connected by way of a branch conduit 140 to the conduit 171 leading to the lock port 66 of the tractor brake actuator 50. The control port 138 leads to a control chamber 142 slidably containing a piston 144 normally urged by a spring 146 to the right hand end of the chamber 142 but retained by pressure at port 138 in the left hand position of the drawing. The piston 144 carries an integral plunger 147 containing a central exhaust passage 148 which, when the piston is in its right hand position, is connected to atmosphere by way of an exhaust port 150. When the piston 144 is in its left hand position the end of the plunger 146 engages a check valve 152 to close the exhaust passage and move the valve 152 against the force of a spring 154 to its open position thereby communicating the inlet port 19 with a central vertical passage 156 in the valve body leading to a cavity 158 containing a second check valve 160 urged to closed position by a spring 162. Axially aligned with the check valve 160 is a plunger 164 containing a central exhaust passage 166 and which is operatively connected to a handle 168 whereby the plunger 164 may be moved from the position in the drawing wherein the outlet port 136 and hence the control port 30 of the tractor protection valve 28 are connected to atmosphere through passage 166 to the phantom line position wherein the plunger 164 engages the check valve 160 to first close off the exhaust passage and thereafter move the check valve 160 to its open position so as to communicate passage 156 with the control port 30 by way of conduit 32.

During normal operation, the handle 100 of the control valve 74 is in the right hand, phantom line "Release" position wherein the parking reservoir 88 is connected to the lock ports 66 by way of conduits 70, 171, double check valve 170 and conduit 68 and is also connected to the control port 138 of valve 20 by way of branch conduit 140 so that piston 144 is moved to its left position of the drawing where it remains throughout normal operation of the vehicle. Under this condition the check valve 152 is moved to its open position and fluid pressure is delivered to cavity 158 from which it may be admitted to or cut off from the control port 30 of the tractor protection valve at the will of the operator by manipulation of the valve handle 168 between its two positions as previously explained.

Assume now a situation wherein the handle 100 of valve 74 is in the "Release" position so that pressure exists at cotnrol port 138 of valve 20 and hence check valve 152 is open, and assume also that handle 168 of valve 20 is in the phantom line position wherein the check valve 160 is likewise retained open. Under these circumstances, should the service reservoir 16 start to leak fluid, when the pressure therein has fallen to a pre-determined level the tractor protection valve will operate to effect an emergency application of the trailer brakes. The operator will be immediately appraised of this and should he depress the brake pedal and find that the tractor brakes do not respond, he would then nevertheless have an alternative source of fluid pressure for applying the tractor brakes which would comprise the pressure trapped in the parking reservoir 88. The operator would apply this pressure to the emergency diaphragms of the tractor actuators 50 merely by moving the handle 100 of valve 74 from the "Release" position to the "Apply" position whereupon, as previously described, fluid pressure from the parking reservoir would be exerted on the emergency diaphragms of the actuators to effect an emergency application of the tractor brakes. After the vehicles have been brought to a stop the operator would release the handle 100 whereupon it would snap into the intermediate "Hold" position to retain the tractor brakes locked in their parked position. At the instant the handle 100 was moved from the "Release" to the "Apply" position the pressure at the lock port 66 and also at the control port 138 of the valve 20 was communicated with atmosphere whereupon the piston 144 of valve 20 moves to the right and the check valve 152 moves to its closed position as previously explained.

For the foregoing description it will be apparent that the valve 20 of the invention serves not only to prevent the release of the trailer brakes when the tractor brakes are locked in applied position but it also isolates the fluid utilized for parking or emergency stopping purposes from the fluid utilized for normal service braking, while serving at the same time as a means for conditioning the trailer brakes so that they are operative or inoperative depending upon whether the tractor brake locking means are in locked or released condition.

It will be apparent to those skilled in the art that the invention is susceptible of a variety of changes and modifications without departing from the scope and spirit of the appended claims.

I claim:

1. In a tractor braking system including a source of service fluid pressure, a brake valve, fluid pressure actuators, and a tractor protection valve including a control port, an emergency conduit connecting said service source and said tractor protection valve, a service conduit inter-connecting said service source, brake valve, fluid pressure actuators and the tractor protection valve, other conduit means including a normally closed valve inter-connecting said service source and the control port of said tractor protection valve, normally open exhaust valve means in said other conduit means between said normally closed valve and said control port, spring applied, pressure released, brake locking means for locking said actuators in brake applied position, an isolated fluid pressure source on said tractor, a fluid pressure responsive element operatively connected to said exhause valve means and said normally closed valve in said other conduit means, a manual control valve having an inlet port connected to said isolated source of fluid pressure, an outlet port and an exhaust port, said control valve being alternatively operable to connect said outlet port to either said inlet or said exhaust port while disconnecting it from the other port, and fourth conduit means inter-connecting the outlet port of said manual control valve with said fluid pressure responsive element and said brake locking means whereby pressure admitted to the brake locking means to release the same is simultaneously admitted to the fluid pressure responsive element to close the exhaust valve means in said other conduit and open said normally closed valve to admit fluid from said service pressure source to the control port of the tractor protection valve.

2. In the system of claim 1 including a second manual control valve in said other conduit means between said control port and said exhaust valve means, said second manual control valve being operable to connect said control port to atmosphere while disconnecting it from said other conduit means and vice versa independently of said normally closed valve and said exhaust valve means.

References Cited by the Examiner
UNITED STATES PATENTS

| | | | |
|---|---|---|---|
| 2,999,513 | 9/1961 | Oetiker | 137—620 |
| 3,087,760 | 4/1963 | Valentine et al. | 303—9 |
| 3,095,244 | 6/1963 | Valentine et al. | 303—9 |
| 3,107,693 | 10/1963 | Puster et al. | 137—625.66 |

EUGENE G. BOTZ, *Primary Examiner.*